(12) United States Patent
Ando et al.

(10) Patent No.: US 10,734,645 B2
(45) Date of Patent: *Aug. 4, 2020

(54) PARTICULATE ACTIVE MATERIAL, POWER STORAGE DEVICE POSITIVE ELECTRODE, POWER STORAGE DEVICE, AND PRODUCTION METHOD FOR PARTICULATE ACTIVE MATERIAL

(71) Applicant: NITTO DENKO CORPORATION, Ibaraki-shi, Osaka (JP)

(72) Inventors: Yohei Ando, Osaka (JP); Yoshihiro Uetani, Osaka (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/841,783

(22) Filed: Dec. 14, 2017

(65) Prior Publication Data

US 2018/0108906 A1    Apr. 19, 2018

Related U.S. Application Data

(63) Continuation of application No. 14/441,563, filed as application No. PCT/JP2013/080488 on Nov. 12, 2013, now Pat. No. 9,882,208.

(30) Foreign Application Priority Data

Nov. 13, 2012    (JP) .................................. 2012-249683

(51) Int. Cl.
*H01M 4/36* (2006.01)
*H01M 4/60* (2006.01)
(Continued)

(52) U.S. Cl.
CPC ............ *H01M 4/366* (2013.01); *H01G 11/42* (2013.01); *H01G 11/48* (2013.01); *H01M 4/36* (2013.01);
(Continued)

(58) Field of Classification Search
CPC .......... H01M 4/36; H01M 10/05; H01M 4/60; H01M 4/366; H01M 4/622; H01M 4/624;
(Continued)

(56) References Cited

U.S. PATENT DOCUMENTS 4,869,979 A    9/1989  Ohtani et al.
5,202,202 A    4/1993  Nagai et al.
(Continued)

FOREIGN PATENT DOCUMENTS

CN    1291800 A    4/2001
EP    0 966 054 A1    12/1999
(Continued)

OTHER PUBLICATIONS

JP 2007-173134MT (Year: 2007).*
(Continued)

*Primary Examiner* — Alexander Usyatinsky
(74) *Attorney, Agent, or Firm* — Sughrue Mion, PLLC

(57) ABSTRACT

A particulate active material for a power storage device positive electrode having a higher energy density is provided, which includes particles of an electrically conductive polymer and a conductive agent, wherein the electrically conductive polymer particles each have a surface coated with the conductive agent.

14 Claims, 3 Drawing Sheets

(51) Int. Cl.

| | | |
|---|---|---|
| *H01M 4/62* | (2006.01) | |
| *H01G 11/42* | (2013.01) | |
| *H01G 11/48* | (2013.01) | |
| *H01M 10/05* | (2010.01) | |
| *H01M 10/052* | (2010.01) | |
| *C08G 73/02* | (2006.01) | |
| *C08L 79/02* | (2006.01) | |
| *H01M 4/02* | (2006.01) | |

(52) U.S. Cl.
CPC .......... *H01M 4/606* (2013.01); *H01M 4/622* (2013.01); *H01M 4/625* (2013.01); *H01M 10/05* (2013.01); *C08G 73/0266* (2013.01); *C08L 79/02* (2013.01); *H01M 10/052* (2013.01); *H01M 2004/028* (2013.01); *H01M 2220/30* (2013.01); *Y02E 60/13* (2013.01)

(58) Field of Classification Search
CPC ............. H01M 4/606; H01M 2220/30; H01M 10/052; H01M 2004/028
See application file for complete search history.

(56) References Cited

U.S. PATENT DOCUMENTS

| | | | |
|---|---|---|---|
| 6,300,015 B1 | 10/2001 | Nishiyama et al. | |
| 6,558,841 B1 | 5/2003 | Nakagiri et al. | |
| 6,558,864 B2* | 5/2003 | Ishiyama | G03G 9/0804 430/108.6 |
| 2002/0034583 A1* | 3/2002 | Jung | H01M 4/1391 427/126.3 |
| 2002/0086203 A1* | 7/2002 | Nobuta | H01M 4/608 429/101 |
| 2004/0185342 A1* | 9/2004 | Takeuchi | C08G 73/0694 429/213 |
| 2008/0131685 A1 | 6/2008 | Lee | |
| 2009/0095942 A1* | 4/2009 | Yamaguchi | H01M 4/131 252/500 |
| 2009/0239151 A1 | 9/2009 | Nakanishi et al. | |
| 2010/0055572 A1 | 3/2010 | Park et al. | |
| 2012/0015249 A1 | 1/2012 | Awano et al. | |

FOREIGN PATENT DOCUMENTS

| | | | |
|---|---|---|---|
| EP | 1 081 777 A2 | | 3/2001 |
| EP | 1 881 544 A1 | | 1/2008 |
| JP | 62-157678 A | | 7/1987 |
| JP | 1-132052 A | | 5/1989 |
| JP | 2-239572 A | | 9/1990 |
| JP | 3-129679 A | | 6/1991 |
| JP | 7-335263 A | | 12/1995 |
| JP | 11-288717 A | | 10/1999 |
| JP | 11-329438 A | | 11/1999 |
| JP | 2000-077100 A | | 3/2000 |
| JP | 2002-25558 A | | 1/2002 |
| JP | 2007-173134 A | | 7/2007 |
| JP | 2007173134 | * | 8/2007 |
| JP | 2009-93880 A | | 4/2009 |
| JP | 2009-535477 A | | 10/2009 |
| JP | 2009-259723 A | | 11/2009 |
| JP | 2011-181387 A | | 9/2011 |

OTHER PUBLICATIONS

Zhang et all. "Nanostructures of Polyaniline Doped with Inorganic Acids", Macromolecules 2002, 35, 5937-5942 (Year: 2002).*
The Decision of JPO to grant a Patent to Application No. 2012249683(Japanese counterpart of the instant Application) dated Dec. 6, 2018 (Year: 2018).*
Third Office Action dated Sep. 5, 2017, from the State Intellectual Property Office of the P.R.C. in counterpart application No. 201380058847.9.
Communication dated Feb. 28, 2017, mailed from the State Intellectual Property Office of People's Republic of China in counterpart Application No. 201380058847.9.
Communication dated Jul. 6, 2016, from the State Intellectual Property Office of People's Republic of China in counterpart application No. 201380058847.9.
Communication dated May 31, 2017, from the European Patent Office in counterpart European application No. 13855048.8.
Communication, dated Jan. 31, 2017, from the Japanese Patent Office in counterpart Japanese application No. 2012-249683.
International Search Report for PCT/JP2013/080488 dated Jan. 21, 2014.
Notification of Reasons for Refusal, dated Jun. 21, 2016, from the Japanese Patent Office in counterpart Japanese application No. 2012-249683.
Supplemental Search Report dated Apr. 8, 2016 from European Patent Office in counterpart Application No. 13855048.8.
Communication dated Nov. 26, 2018 from the European Patent Office in counterpart Application No. 13 855 048.8.
Notification of Reason for Refusal dated Jan. 6, 2020, issued by the Korean Intellectual Property Office in Korean Application No. 10-2015-7012222.

* cited by examiner 1  2  3  4  5

PARTICULATE ACTIVE MATERIAL, POWER STORAGE DEVICE POSITIVE ELECTRODE, POWER STORAGE DEVICE, AND PRODUCTION METHOD FOR PARTICULATE ACTIVE MATERIAL

This is a continuation of application Ser. No. 14/441,563, filed May 8, 2015, which is a National Stage of International Application No. PCT/JP2013/080488, filed Nov. 12, 2013, claiming priority from Japanese Patent Application No. 2012-249683, filed Nov. 13, 2012, the contents of which are hereby incorporated by reference into this application.

TECHNICAL FIELD

The present invention relates to a particulate active material for a positive electrode of a higher performance power storage device having a higher energy density, a power storage device positive electrode and a power storage device each employing the particulate active material, and a production method for the particulate active material for the power storage device positive electrode.

BACKGROUND ART

With recent improvement and advancement of electronics technology for mobile PCs, mobile phones, personal digital assistants (PDAs) and the like, secondary batteries and the like, which can be repeatedly charged and discharged, are widely used as power storage devices for these electronic apparatuses. For these secondary batteries and other electrochemical power storage devices, electrode materials desirably have a higher capacity and a rapid charge/discharge property.

An electrode for such a power storage device contains an active material which is capable of ion insertion/desertion. The ion insertion/desertion of the active material is also referred to as doping/dedoping, and the doping/dedoping amount per unit molecular structure is referred to as dope ratio (or doping ratio). A material having a higher doping ratio can provide a higher capacity battery.

From an electrochemical viewpoint, the capacity of the battery can be increased by using an electrode material having a greater ion insertion/desertion amount. In lithium secondary batteries, which are attractive power storage devices, more specifically, a graphite-based negative electrode capable of lithium ion insertion/desertion is used in which about one lithium ion is inserted and deserted with respect to six carbon atoms to provide a higher capacity.

Of these lithium secondary batteries, a lithium secondary battery which has a higher energy density and is therefore widely used as the power storage device for the aforesaid electronic apparatuses includes a positive electrode prepared by using a lithium-containing transition metal oxide such as lithium manganese oxide or lithium cobalt oxide and a negative electrode prepared by using a carbon material capable of lithium ion insertion/desertion, the positive electrode and the negative electrode being disposed in opposed relation in an electrolyte solution.

However, this lithium secondary battery, which generates electric energy through an electrochemical reaction, disadvantageously has a lower power density because of its lower electrochemical reaction rate. Further, the lithium secondary battery has a higher internal resistance, so that rapid discharge and rapid charge of the secondary battery are difficult. In addition, the secondary battery generally has a shorter service life, i.e., a poorer cycle characteristic, because the electrodes and the electrolyte solution are degraded due to the electrochemical reaction associated with the charge and the discharge.

There is also known a lithium secondary battery in which an electrically conductive polymer, such as a polyaniline containing a dopant, is used as a positive electrode active material to cope with the aforesaid problem (see PTL1).

In general, however, the secondary battery employing the electrically conductive polymer as the positive electrode active material is of an anion migration type in which the electrically conductive polymer is doped with an anion in a charge period and dedoped with the anion in a discharge period. Where a carbon material or the like capable of lithium ion insertion/desertion is used as a negative electrode active material, it is therefore impossible to provide a rocking chair-type secondary battery of cation migration type in which a cation migrates between the electrodes in the charge/discharge. That is, the rocking chair-type secondary battery is advantageous in that a smaller amount of the electrolyte solution is required, but the secondary battery employing the electrically conductive polymer as the positive electrode active material cannot enjoy this advantage. Therefore, it is impossible to contribute to the size reduction of the power storage device.

To cope with this problem, a secondary battery of a cation migration type is proposed which is substantially free from change in the ion concentration of the electrolyte solution without the need for a greater amount of the electrolyte solution, and aims at improving the capacity density and the energy density per unit volume or per unit weight. This secondary battery includes a positive electrode prepared by using an electrically conductive polymer containing a polymer anion such as polyvinyl sulfonate as a dopant, and a negative electrode of metal lithium (see PTL2).

RELATED ART DOCUMENT

Patent Documents

PTL1: JP-A-HEI3(1991)-129679
PTL2: JP-A-HEI1(1989)-132052

SUMMARY OF INVENTION

However, the secondary batteries described above are not satisfactory in performance. That is, these batteries are lower in capacity density and energy density than the lithium secondary battery employing the lithium-containing transition metal oxide such as lithium manganese oxide or lithium cobalt oxide for the positive electrode.

In order to solve the aforementioned problems associated with the prior art power storage devices such as the lithium secondary batteries, the present invention provides a particulate active material for a power storage device positive electrode having a higher energy density, the power storage device positive electrode and a power storage device employing the particulate active material, and a production method for the active material for the power storage device positive electrode.

The inventors of the present invention conducted intensive studies to provide a higher performance power storage device having a higher energy density. The inventors focused on a particulate active material to be used for the power storage device positive electrode in the studies, and further conducted studies on the active material. The energy density can be increased by increasing the proportion of a conductive agent with respect to the electrically conductive polymer. If the conductive agent is blended in a higher proportion with the electrically conductive polymer, it is difficult to knead the resulting electrode material. The inventors further conducted experiments and, as a result, found that a higher performance power storage device having a higher energy density can be provided without blending the conductive agent in a higher proportion by using a particulate active material prepared by coating surfaces of particles of the electrically conductive polymer with the conductive agent. Although the reason for this is not necessarily clarified, this is supposedly because the electrical conductivity of the whole particulate active material is increased by forming coating layers of the conductive agent on the surfaces of the electrically conductive polymer particles serving as cores, thereby facilitating the migration of electrons to a current collector. As a result, ion migration can be efficiently achieved in the charge and discharge, thereby increasing the energy density.

According to a first inventive aspect, there is provided a particulate active material for a power storage device positive electrode, the particulate active material including particles of an electrically conductive polymer and a conductive agent, wherein the electrically conductive polymer particles each have a surface coated with the conductive agent.

According to a second inventive aspect, there is provided a power storage device positive electrode employing a particulate active material including particles of an electrically conductive polymer and a conductive agent, wherein the particles of the electrically conductive polymer each have a surface coated with the conductive agent.

According to a third inventive aspect, there is provided a power storage device, which includes an electrolyte layer, and a positive electrode and a negative electrode provided in opposed relation with the electrolyte layer interposed therebetween, wherein the positive electrode is produced by using a particulate active material including particles of an electrically conductive polymer each having a surface coated with a conductive agent.

According to a fourth inventive aspect, there is provided a method for producing a particulate active material including particles of an electrically conductive polymer and a conductive agent for a power storage device positive electrode, the method including the step of shearing the particles of the electrically conductive polymer and the conductive agent by means of a composite particle producing apparatus to coat surfaces of the electrically conductive polymer particles with the conductive agent.

The inventive particulate active material includes the electrically conductive polymer particles each having a surface coated with the conductive agent and, therefore, the power storage device positive electrode containing the particulate active material and the power storage device employing the power storage device positive electrode each have a higher energy density.

Where the electrically conductive polymer is a polyaniline or a polyaniline derivative, the resulting power storage device is further improved in energy density.

Where the electrically conductive polymer particles and the conductive agent are sheared by means of the composite particle producing apparatus, the surfaces of the electrically conductive polymer particles can be uniformly and tightly coated with the conductive agent. This increases the electrical conductivity of the particulate active material, thereby further improving the energy density.

DESCRIPTION OF EMBODIMENTS

An embodiment of the present invention will hereinafter be described in detail by way of example but not by way of limitation.

A particulate active material to be used for a power storage device positive electrode (hereinafter sometimes referred to simply as "particulate active material") according to the present invention includes particles of an electrically conductive polymer and a conductive agent, and the electrically conductive polymer particles each have a surface coated with the conductive agent. Unless otherwise specified, the inventive particulate active material means coated particles prepared by forming a coating of the conductive agent on the surfaces of the electrically conductive polymer particles serving as cores.

Figure 1:
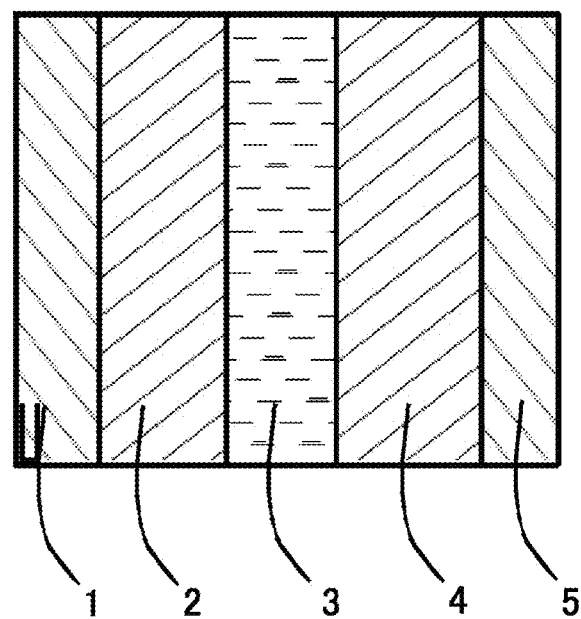
FIG. 1 is a sectional view showing an exemplary power storage device.

The power storage device includes, for example, an electrolyte layer 3, and a positive electrode 2 and a negative electrode 4 provided in opposed relation with the electrolyte layer 3 interposed therebetween as shown in FIG. 1, and the inventive particulate active material is used for the positive electrode 2. In FIG. 1, reference numerals 1 and 5 designate a positive electrode current collector and a negative electrode current collector, respectively.

The positive electrode, the negative electrode and the electrolyte layer will be successively described.

<Positive Electrode>

The positive electrode is produced by using a positive electrode material containing the particulate active material including the electrically conductive polymer particles each having a surface coated with the conductive agent.

[Electrically Conductive Polymer]

The electrically conductive polymer serving as the cores of the inventive particulate active material will be described. The electrically conductive polymer described above is herein defined as any of polymers which have an electrical conductivity variable due to insertion or desertion of ion species with respect to the polymer in order to compensate for change in electric charge to be generated or removed by an oxidation reaction or a reduction reaction occurring in a main chain of the polymer.

The polymer has a higher electrical conductivity in a doped state, and has a lower electrical conductivity in a dedoped state. Even if the electrically conductive polymer loses its electrical conductivity due to the oxidation reaction or the reduction reaction to be thereby electrically insulative (in the dedoped state), the polymer can reversibly have an electrical conductivity again due to the oxidation/reduction reaction. Therefore, the electrically insulative polymer in the dedoped state is herein also classified into the category of the electrically conductive polymer.

A preferred example of the electrically conductive polymer is a polymer containing a dopant of at least one protonic acid anion selected from the group consisting of inorganic acid anions, aliphatic sulfonate anions, aromatic sulfonate anions, polymeric sulfonate anions and polyvinyl sulfate anions. Another preferred example of the electrically conductive polymer is a polymer obtained in the dedoped state by dedoping the electrically conductive polymer described above.

Specific preferable examples of the electrically conductive polymer include polyacetylene, polypyrrole, polyaniline, polythiophene, polyfuran, polyselenophene, polyisothianaphthene, polyphenylene sulfide, polyphenylene oxide, polyazulene, poly(3,4-ethylenedioxythiophene) and substitution products of these polymers. Particularly, polyaniline, polyaniline derivatives, polypyrrole and polypyrrole derivatives each having a higher electrochemical capacity are preferably used, and polyaniline and polyaniline derivatives are further preferably used.

In the present invention, polyaniline is a polymer prepared by electrolytic polymerization or chemical oxidation polymerization of aniline, and the polyaniline derivatives are polymers prepared by electrolytic polymerization or chemical oxidation polymerization of aniline derivatives.

Examples of the aniline derivatives include aniline derivatives prepared by substituting aniline at positions other than the 4-position thereof with at least one substituent selected from the group consisting of alkyl groups, alkenyl groups, alkoxy groups, aryl groups, aryloxy groups, alkylaryl groups, arylalkyl groups and alkoxyalkyl groups. Specific examples of the aniline derivatives include o-substituted anilines such as o-methylaniline, o-ethylaniline, o-phenylaniline, o-methoxyaniline and o-ethoxyaniline, and m-substituted anilines such as m-methylaniline, m-ethylaniline, m-methoxyaniline, m-ethoxyaniline and m-phenylaniline, which may be used either alone or in combination. Though having a substituent at the 4-position, p-phenylaminoaniline is advantageously used as the aniline derivative because polyaniline can be provided by the oxidation polymerization of p-phenylaminoaniline.

"Aniline or an aniline derivative" is herein referred to simply as "aniline" unless otherwise specified. "At least one of the polyaniline and the polyaniline derivative" is herein referred to simply as "polyaniline" unless otherwise specified. Even if a polymer for the electrically conductive polymer is prepared from an aniline derivative, therefore, the resulting polymer is referred to as "electrically conductive polyaniline."

[Conductive Agent]

In the present invention, the conductive agent to be used for coating the surfaces of the electrically conductive polymer particles serving as the cores of the particulate active material may be an electrically conductive material free from change in its properties which may otherwise occur when a potential is applied in the discharge of the power storage device. Examples of the conductive agent include electrically conductive carbon materials and metal materials, among which electrically conductive carbon blacks such as acetylene black and Ketjen black, and fibrous carbon materials such as carbon fibers and carbon nanotubes are preferred. The electrically conductive carbon blacks are particularly preferred.

The proportion of the conductive agent is preferably 1 to 30 parts by weight, more preferably 4 to 20 parts by weight, particularly preferably 8 to 18 parts by weight, based on 100 parts by weight of the electrically conductive polymer. Where the proportion of the conductive agent is within this range, it is possible to prepare the active material without any defect in shape and properties and to effectively improve the rate characteristics.

[Particulate Active Material]

The inventive particulate active material is prepared by shearing the electrically conductive polymer particles and the conductive agent by means of a composite particle producing apparatus. Examples of the composite particle producing apparatus include NOBILTA and MECHANO-FUSION available from Hosokawa Micron Corporation, MIRROR-D available from Nara Machinery Co., Ltd., and COMPOSI and CONPIX available from Nippon Coke & Engineering Co., Ltd.

The inventive particulate active material thus prepared (coated particles prepared by the coating with the conductive agent) preferably has a particle size (median diameter) of 0.001 to 1000 µm, more preferably 0.01 to 100 µm, particularly preferably 0.1 to 20 µm. The median diameter is measured, for example, by means of a static light-scattering particle diameter distribution analyzer or the like.

The electrically conductive polymer particles before the coating with the conductive agent have substantially the same particle size as the particulate active material (coated particles).

In the present invention, a binder, a conductive agent, water and the like may be blended as required with the particulate active material for the positive electrode material.

Usable examples of the binder include vinylidene fluoride and a styrene-butadiene rubber. Other examples of the binder include a polymer anion, anion compounds having a relatively great molecular weight, and anionic polymers having a lower solubility in the electrolyte solution.

Particularly, the anionic polymer is preferably used as a major component of the binder. The major component herein means a component that accounts for the majority of the binder, and the binder may include the major component alone.

Examples of the anionic polymer materials include a polymer anion, anionic compounds each having a relatively great molecular weight, and anionic compounds each having a lower solubility in the electrolyte solution. More specifically, a compound having a carboxyl group in a molecule thereof is preferably used and, particularly, a polymeric polycarboxylic acid is preferably used. Where the polycarboxylic acid is used as the anionic polymer material, the polycarboxylic acid functions as the dopant in addition to the binder, thereby improving the characteristic properties of the power storage device.

Examples of the polycarboxylic acid include polyacrylic acid, polymethacrylic acid, polyvinylbenzoic acid, polyallylbenzoic acid, polymethallylbenzoic acid, polymaleic acid, polyfumaric acid, polyglutamic acid and polyasparaginic acid, among which polyacrylic acid and polymethacrylic acid are particularly preferred. These polycarboxylic acids may be used either alone or in combination.

The polycarboxylic acid may be a polycarboxylic acid of lithium-exchanged type prepared by lithium-exchanging carboxyl groups of a carboxyl-containing compound. The lithium exchange percentage is ideally 100%, but may be lower, preferably 40% to 100%.

Where the polymer such as the polycarboxylic acid is used as the binder, the polymer also functions as the dopant. Therefore, the inventive power storage device has a rocking chair-type mechanism, which contributes to the improvement of the characteristic properties of the power storage device.

The binder is generally used in an amount of 1 to 100 parts by weight, preferably 2 to 70 parts by weight, most preferably 5 to 40 parts by weight, based on 100 parts by weight of the electrically conductive polymer. If the amount of the binder is excessively small, it will be impossible to provide a homogenous electrode. If the amount of the binder is excessively great, the relative amount of the active material is reduced, making it impossible to provide a power storage device having a higher energy density.

In the present invention, the conductive agent to be optionally blended in the positive electrode material as required may be the same as the conductive agent to be used for the particulate active material. The conductive agent may be an electrically conductive material free from change in its properties which may otherwise occur when a potential is applied in the discharge of the power storage device. Examples of the conductive agent include electrically conductive carbon materials and metal materials, among which electrically conductive carbon blacks such as acetylene black and Ketjen black, and fibrous carbon materials such as carbon fibers and carbon nanotubes are preferred. The electrically conductive carbon blacks are particularly preferred.

The conductive agent to be optionally used is generally separate from the conductive agent to be used for the coating of the surfaces of the electrically conductive polymer particles, but may be the same as or different from the conductive agent for the particulate active material.

The proportion of the optional conductive agent is preferably 1 to 30 parts by weight, more preferably 4 to 20 parts by weight, particularly preferably 8 to 18 parts by weight, based on 100 parts by weight of the electrically conductive polymer.

The inventive power storage device positive electrode is preferably made of a composite material including the particulate active material, the binder and the like, and is generally provided in the form of porous sheet.

The positive electrode typically has a thickness of 1 to 500 μm, more preferably 10 to 300 μm. The thickness of the positive electrode is measured, for example, by means of a dial gage (available from Ozaki Mfg. Co., Ltd.) which is a flat plate including a distal portion having a diameter of 5 mm. The measurement is performed at ten points on a surface of the electrode, and the measurement values are averaged. Where the positive electrode (porous layer) is provided on the current collector and combined with the current collector, the thickness of the combined product is measured in the aforementioned manner, and the measurement values are averaged. Then, the thickness of the positive electrode is determined by subtracting the thickness of the current collector from the average thickness of the combined product.

The inventive power storage device positive electrode is produced, for example, in the following manner. The conductive agent, the binder and water are added to the particulate active material including the electrically conductive polymer particles, and a slurry is prepared by dispersing the particulate active material in the resulting mixture. Then, the slurry is applied onto the current collector, and shaped into a sheet by evaporating water from the slurry. Thus, the positive electrode (sheet electrode) is provided as a composite product in which a layer of a mixture of the particulate active material and the optional binder is provided on the current collector.

<Negative Electrode>

The negative electrode described above is preferably produced from a metal or a negative electrode material (negative electrode active material) capable of ion insertion/desertion. Examples of the negative electrode active material include metal lithium, carbon materials and transition metal oxides capable of insertion and desertion of lithium ions in oxidation and reduction, silicon and tin. The negative electrode preferably has substantially the same thickness as the positive electrode.

<Electrolyte Layer>

The electrolyte layer described above is formed from an electrolyte. For example, a sheet including a separator impregnated with an electrolyte solution or a sheet made of a solid electrolyte is preferably used. The sheet made of the solid electrolyte per se functions as a separator.

The electrolyte includes a solute and, as required, a solvent and additives. Preferred examples of the solute include compounds prepared by combining a metal ion such as a lithium ion with a proper counter ion such as a sulfonate ion, a perchlorate ion, a tetrafluoroborate ion, a hexafluorophosphate ion, a hexafluoroarsenate ion, a bis(trifluoromethanesulfonyl)imide ion or a bis(pentafluoroethanesulfonyl)imide ion or a halide ion. Specific examples of the electrolyte include $LiCF_3SO_3$, $LiClO_4$, $LiBF_4$, $LiPF_6$, $LiAsF_6$, $LiN(SO_2CF_3)_2$, $LiN(SO_2C_2F_5)_2$ and $LiCl$.

Examples of the solvent include nonaqueous solvents, i.e., organic solvents, such as carbonates, nitriles, amides and ethers. Specific examples of the organic solvents include ethylene carbonate, propylene carbonate, butylene carbonate, dimethyl carbonate, diethyl carbonate, ethyl methyl carbonate, acetonitrile, propionitrile, N,N'-dimethylacetamide, N-methyl-2-pyrrolidone, dimethoxyethane, diethoxyethane and γ-butyrolactone, which may be used either alone or in combination. A solution prepared by dissolving the solute in the solvent may be referred to as "electrolyte solution."

Examples of the additives include an electrode surface controlling agent such as vinylene carbonate, an overcharge preventing agent such as biphenyl, cyclohexylbenzene and fluorinated anisole, a flame retardant such as phosphates and phosphazenes, which comprehensively balance the operation voltage, the charge/discharge rate, the safety, the service life and the like.

The power storage device includes a separator in addition to the current collectors, the positive electrode, the electrolyte layer and the negative electrode. The separator may be used in a variety of forms. For example, the separator may be an insulative porous sheet which is capable of preventing an electrical short circuit between the positive electrode and the negative electrode and electrochemically stable and has a higher ion permeability and a certain mechanical strength. Preferably usable examples of the porous sheet include paper, nonwoven fabrics, porous sheets made of resins such as polypropylene, polyethylene and polyimide, which may be used either alone or in combination. Where the electrolyte layer 3 is a solid electrolyte sheet as described above, the solid electrolyte sheet per se functions as the separator, thereby obviating the need for additionally preparing the separator.

The current collectors 1, 5 shown in FIG. 1 are required to have a higher electron conductivity and permit volume reduction in the inside of the battery (thickness reduction) and easy processing. Exemplary materials for the current collectors satisfying these characteristic requirements include metal foils and meshes such as of nickel, aluminum, stainless steel and copper. The positive electrode current collector (e.g., current collector 1) and the negative electrode current collector (e.g., current collector 5) may be formed of the same material or may be formed of different materials.

<Power Storage Device>

Next, the power storage device employing the inventive power storage device positive electrode will be described. The inventive power storage device includes, for example, the electrolyte layer 3, and the positive electrode 2 and the negative electrode 4 provided in opposed relation with the electrolyte layer 3 interposed therebetween as shown in FIG. 1.

The power storage device employing the inventive power storage device positive electrode is produced, for example, in the following manner by using the aforementioned negative electrode and the like. That is, the positive electrode, the separator and the negative electrode are stacked with the separator interposed between the positive electrode and the negative electrode, whereby a stacked component is prepared. The stacked component is put in a battery container such as an aluminum laminate package, and then the resulting battery container is dried in vacuum. In turn, an electrolyte solution is injected in the battery container dried in vacuum, and an opening of the package (battery container) is sealed. Thus, the power storage device is produced. The battery production process including the injection of the electrolyte solution in the package is preferably performed in a glove box in an inert gas atmosphere such as an ultrapure argon gas atmosphere.

Besides the laminate cell, the inventive power storage device may be provided in a variety of forms including a film form, a sheet form, a square form, a cylindrical form and a button form. In the case of the laminate cell, the positive electrode of the power storage device preferably has an edge length of 1 to 300 mm, particularly preferably 10 to 50 mm, and the negative electrode preferably has an edge length of 1 to 400 mm, particularly preferably 10 to 60 mm. The negative electrode preferably has a slightly greater size than the positive electrode.

The inventive power storage device, like an electric double layer capacitor, has a higher weight power density and excellent cycle characteristics. In addition, the power storage device has a significantly higher weight energy density than the prior art electric double layer capacitor. Therefore, the power storage device may be a kind of a capacitor-type power storage device.

EXAMPLES

Inventive examples will hereinafter be described in conjunction with comparative examples. However, the prevent invention is not limited to these examples.

The following components were prepared before the production of power storage devices according to the inventive examples and the comparative examples.

<Preparation of Electrically Conductive Polyaniline Powder>

Powder of an electrically conductive polyaniline (electrically conductive polymer) containing tetrafluoroboric acid as a dopant was prepared in the following manner. That is, 84.0 g (0.402 mol) of a tetrafluoroboric acid aqueous solution (special grade reagent available from Wako Pure Chemical Industries, Ltd.) having a concentration of 42 wt % was added to 138 g of ion-exchanged water contained in a 300-mL volume glass beaker. Then, 10.0 g (0.107 mol) of aniline was added to the resulting solution, while the solution was stirred by a magnetic stirrer. Immediately after the addition of aniline to the tetrafluoroboric acid aqueous solution, aniline was dispersed in an oily droplet form in the tetrafluoroboric acid aqueous solution, and then dissolved in water in several minutes to provide a homogeneous transparent aniline aqueous solution. The aniline aqueous solution thus provided was cooled to −4° C. or lower with the use of a refrigerant incubator.

Then, 11.63 g (0.134 mol) of a powdery manganese dioxide oxidizing agent (Grade-1 reagent available from Wako Pure Chemical Industries, Ltd.) was added little by little to the aniline aqueous solution, while the mixture in the beaker was kept at a temperature of not higher than −1° C.

Immediately after the oxidizing agent was thus added to the aniline aqueous solution, the color of the aniline aqueous solution turned dark green. Thereafter, the solution was continuously stirred, whereby generation of a dark green solid began.

After the oxidizing agent was added in 80 minutes in this manner, the resulting reaction mixture containing the reaction product thus generated was cooled, and further stirred for 100 minutes. Thereafter, the resulting solid was suction-filtered through No. 2 filter paper (available from ADVANTEC Corporation) with the use of a Buchner funnel and a suction bottle to provide powder. The powder was washed in an about 2 mol/L tetrafluoroboric acid aqueous solution with stirring by means of the magnetic stirrer, then washed in acetone several times with stirring, and suction-filtered. The resulting powder was dried in vacuum at a room temperature (25° C.) for 10 hours. Thus, 12.5 g of an electrically conductive polyaniline containing tetrafluoroboric acid as a dopant (hereinafter referred to simply as "electrically conductive polyaniline") was provided, which was bright green powder.

(Electrical Conductivity of Electrically Conductive Polyaniline Powder)

After 130 mg of the electrically conductive polyaniline powder was milled in an agate mortar, the resulting powder was compacted into an electrically conductive polyaniline disk having a diameter of 13 mm and a thickness of 720 μm in vacuum at a pressure of 75 MPa for 10 minutes by means of a KBr tablet forming machine for infrared spectrum measurement. The disk had an electrical conductivity of 19.5 S/cm measured by four-point electrical conductivity measurement by the Van der Pauw method.

(Preparation of Electrically Conductive Polyaniline Powder in Dedoped State)

The electrically conductive polyaniline powder prepared in the doped state in the aforementioned manner was put in a 2 mol/L sodium hydroxide aqueous solution, and stirred in a 3-L separable flask for 30 minutes. Thus, the electrically conductive polyaniline powder was dedoped with the tetrafluoroboric acid dopant through a neutralization reaction. The dedoped polyaniline was washed with water until the filtrate became neutral. Then, the dedoped polyaniline was washed in acetone with stirring, and suction-filtered through No. 2 filter paper with the use of a Buchner funnel and a suction bottle. Thus, dedoped polyaniline powder was provided on the No. 2 filter paper. The resulting powder was dried in vacuum at a room temperature for 10 hours, whereby brown dedoped polyaniline powder was provided.

(Preparation of Polyaniline Powder in Reduced-Dedoped State)

Next, the dedoped polyaniline powder was put in a phenylhydrazine methanol aqueous solution, and reduced for 30 minutes with stirring. Due to the reduction, the color of the polyaniline powder turned from brown to gray. After the reaction, the resulting polyaniline powder was washed with methanol and then with acetone, filtered, and dried in vacuum at a room temperature. Thus, reduced-dedoped polyaniline was provided.

A particle of the resulting powder had a median diameter of 13 μm as measured by a light scattering method by using acetone as a solvent.

(Electrical Conductivity of Reduced-Dedoped Polyaniline Powder)

After 130 mg of the reduced-dedoped polyaniline powder was milled in an agate mortar, the resulting powder was compacted into a reduced-dedopedpolyaniline disk having a thickness of 720 μm in vacuum at a pressure of 75 MPa for 10 minutes by means of a KBr tablet forming machine for infrared spectrum measurement. The disk had an electrical conductivity of $5.8 \times 10^{-3}$ S/cm measured by four-point electrical conductivity measurement by the Van der Pauw method. This means that the polyaniline compound was an active material compound having an electrical conductivity variable due to ion insertion/desertion.

<Preparation of Binder Solution>

Polyacrylic acid (available from Wako Pure Chemical Industries, Ltd., and having a weight average molecular weight of 1,000,000) was dissolved in water, whereby 20.5 g of a homogeneously viscous polyacrylic acid aqueous solution having a concentration of 4.4 wt % was provided. Then, 0.15 g of lithium hydroxide was added to and dissolved in the resulting polyacrylic acid aqueous solution, whereby a polyacrylic acid-lithium polyacrylate composite solution (binder solution) was prepared in which 50% of acrylic acid portions were lithium-exchanged.

<Preparation of Separator>

A nonwoven fabric (TF40-50 available from Hohsen Corporation and having a porosity of 55%) was prepared.

<Preparation of Negative Electrode>

Metal lithium (rolled metal lithium available from Honjo Metal Co., Ltd.) having a thickness of 50 μm was prepared.

<Preparation of Electrolyte Solution>

An ethylene carbonate/dimethyl carbonate solution containing lithium tetrafluoroborate ($LiBF_4$) at a concentration of 1 mol/dm$^3$ (available from Kishida Chemical Co., Ltd.) was prepared.

<Tab Electrodes>

A 50-μm thick aluminum metal foil was prepared as a current extraction tab electrode for the positive electrode, and a 50-μm thick nickel metal foil was prepared as a current extraction tab electrode for the negative electrode.

<Current Collectors>

A 30-μm thick aluminum foil was prepared as a positive electrode current collector, and a 180-μm thick stainless steel mesh was prepared as a negative electrode current collector.

Positive electrode slurries were each prepared for production of the positive electrode by using the materials prepared in the aforementioned manner.

[Slurry for Example 1]

First, 4 g of the polyaniline powder prepared in the aforementioned manner and 0.5 g (equivalent to 13 parts by weight based on 100 parts by weight of the polyaniline powder) of electrically conductive carbon black (conductive agent, DENKA BLACK available from Denki Kagaku Kogyo K.K.) were treated by means of a composite particle producing apparatus (NOBILTA available from Hosokawa Micron Corporation) for 30 minutes under rotational conditions with a load power of 500 W in a volume of 80 cc. Thus, polyaniline particles each having a surface coated with the conductive agent were produced. After the resulting polyaniline particles were added to 20.5 g of the polyacrylic acid/lithium polyacrylate composite solution prepared in the aforementioned manner and thoroughly kneaded by a spatula, the resulting mixture was ultrasonically treated for 5 minutes by an ultrasonic homogenizer, and treated by a thin-film spin type high-speed mixer (FILMIX MODEL 40-40 available from Primix Corporation). Thus, a fluid slurry was prepared. The slurry was defoamed for 3 minutes by means of a planetary mixer (THINKY MIXER available from Thinky Corporation).

[Slurry for Example 2]

A slurry was prepared in substantially the same manner as in Example 1, except that the amount of the electrically conductive carbon black (conductive agent, DENKA BLACK available from Denki Kagaku Kogyo K.K.) was increased to 1.0 g.

[Slurry for Comparative Example 1]

A slurry was prepared in substantially the same manner as in Example 1, except that the treatment for the coating with the conductive agent by means of the composite particle producing apparatus (NOBILTA available from Hosokawa Micron Corporation) was not performed. More specifically, after 4 g of the polyaniline powder prepared in the aforementioned manner, 0.5 g of electrically conductive carbon black (conductive agent, DENKA BLACK available from Denki Kagaku Kogyo K.K.) and 4 g of water were mixed together, the resulting mixture was added to 20.5 g of the polyacrylic acid/lithium polyacrylate composite solution prepared in the aforementioned manner, and thoroughly kneaded by a spatula. Then, the resulting mixture was ultrasonically treated for 5 minutes by an ultrasonic homogenizer, and treated by a thin-film spin type high-speed mixer (FILMIX MODEL 40-40 available from Primix Corporation). Thus, a fluid slurry was prepared. The slurry was defoamed for 3 minutes by means of a planetary mixer (THINKY MIXER available from Thinky Corporation). Thus, a slurry of Comparative Example 1 was prepared.

Examples 1 and 2

The slurries prepared in the aforementioned manner for Examples 1 and 2 were each applied at a coating rate of 10 mm/sec onto an etched aluminum foil for an electric double layer capacitor (30CB available from Hohsen Corporation) with the use of a desktop automatic coater (available from Tester Sangyo Co., Ltd.) while the coating thickness was adjusted to 360 μm by a doctor blade applicator equipped with a micrometer. The resulting coatings were allowed to stand at a room temperature (25° C.) for 45 minutes, and then dried on a hot plate kept at a temperature of 100° C. Thus, polyaniline sheet electrodes (positive electrodes) were produced.

Comparative Example 1

The slurry prepared in the aforementioned manner for Comparative Example 1 was applied at a coating rate of 10 mm/sec onto an etched aluminum foil for an electric double layer capacitor (30CB available from Hohsen Corporation) with the use of a desktop automatic coater (available from Tester Sangyo Co., Ltd.) while the coating thickness was adjusted to 360 μm by a doctor blade applicator equipped with a micrometer. Then, the resulting coating was dried in a dryer kept at a temperature of 150° C. for 20 minutes. Thus, a polyaniline sheet electrode (positive electrode) was produced.

Figure 2A:
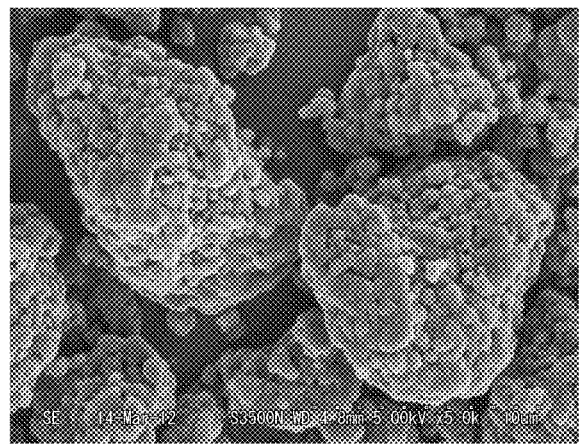
FIGS. 2A, 2B and 2C are SEM photographs of electrically conductive polymer particles of Comparative Example 1, Example 1 and Example 2, respectively.
Figure 2B:
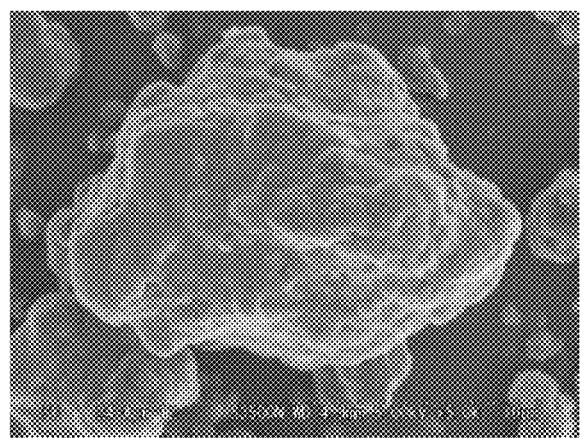
Figure 2C:
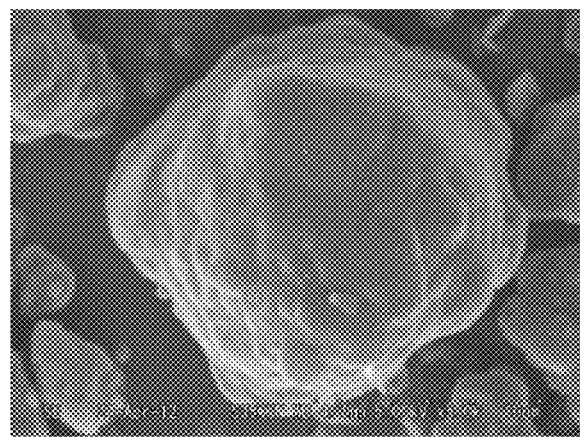

The states of the coatings of the conductive agent in the respective particulate active materials were each observed at a magnification of 5000 by means of a scanning electron microscope (SEM S3500N available from HITACHI Ltd.) FIGS. 2A, 2B and 2C are SEM photographs of the particulate active material used in Comparative Example 1, Example 1 and Example 2, respectively.

The particulate active material of Comparative Example 1 shown in FIG. 2A was prepared without the addition of the conductive agent and, therefore, was the original electrically conductive polymer particles, which each had a surface not coated with the conductive agent. In contrast, the particulate active materials of Examples 1 and 2 shown in FIGS. 2B and 2C, respectively, were free from significant change in particle shape, though each having a slightly greater size than the original electrically conductive polymer particles.

Figure 3A:
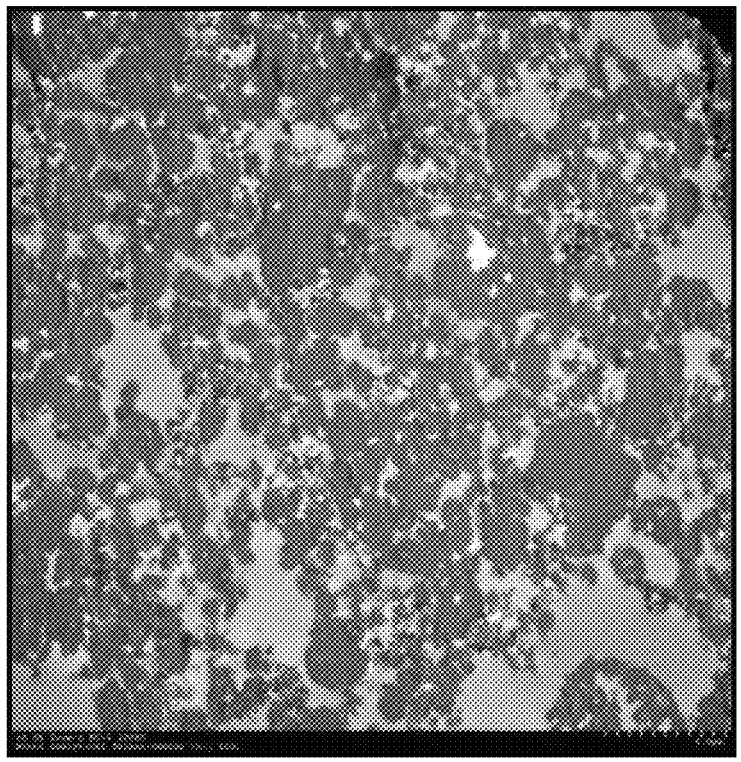
FIGS. 3A and 3B are TEM photographs of sections of positive electrodes of Comparative Example 1 and Example 1, respectively.
Figure 3B:
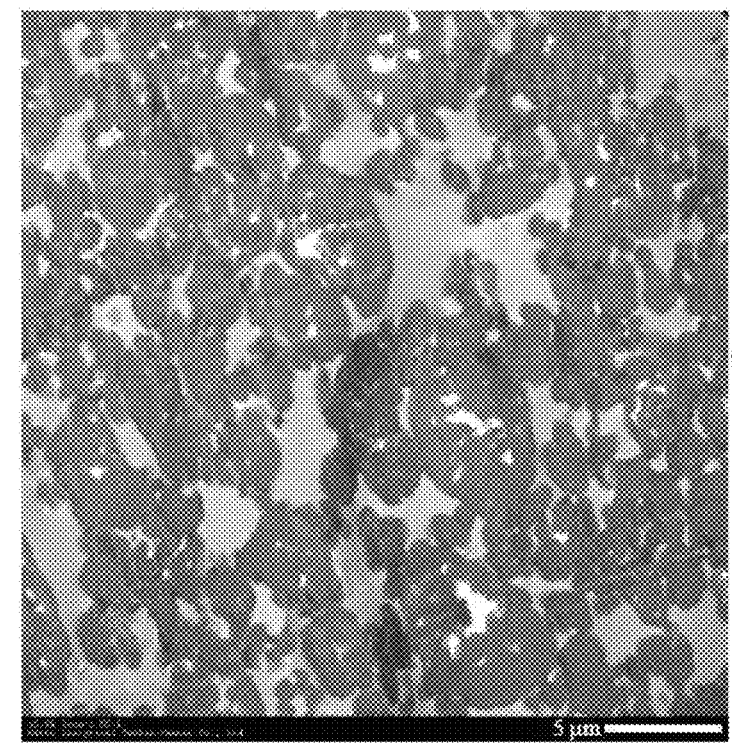

Further, the sections of the positive electrodes of Example 1 and Comparative Example 1 were observed through TEM measurement. After the positive electrodes were impregnated with an impregnation resin to fill internal voids thereof with the impregnation resin, the positive electrodes were each sliced by an ultra-thin slicing method, and the resulting thin slices were observed at a magnification of 5000 by means of a transmissive electron microscope (TEM H-7650 available from Hitachi High-Technologies Corporation). The results are shown in FIGS. 3A and 3B. FIGS. 3A and 3B are TEM photographs of Comparative Example 1 and Example 1, respectively.

In Comparative Example 1, foggy minute spherical particles observed in FIG. 3A were the conductive agent (carbon black), which were present separately from the electrically conductive polymer particles. In Example 1, in contrast, foggy minute spherical particles of the conductive agent were not observed in FIG. 3B, but the particulate active material had a slightly greater particle size than the original electrically conductive polymer particles. This indicates that the conductive agent adhered to the surfaces of the electrically conductive polymer particles. Thus, FIGS. 2A to 2C and FIGS. 3A and 3B indicate that the electrically conductive polymer particles of the particulate active materials of Examples 1 and 2 each had a surface coated with the conductive agent.

<Production of Power Storage Device>

Laminate cells serving as power storage devices (lithium secondary batteries) were each assembled in the following manner by employing the positive electrodes (polyaniline sheet electrodes) produced in Examples 1 and 2 and Comparative Example 1 and other materials prepared as described above.

A battery assembling process was performed in a glove box in an ultrapure argon gas atmosphere (having a dew point of −100° C. therein).

The positive electrode for the laminate cell had an electrode size of 27 mm×27 mm, and the negative electrode had an electrode size of 29 mm×29 mm, which was slightly greater than the positive electrode size.

For use, the metal foils of the tab electrodes for the positive electrode and the negative electrode were preliminarily connected to the corresponding current collectors by means of a spot welding machine. The polyaniline sheet electrode (positive electrode), the stainless steel mesh prepared as the negative electrode current collector, and the separator were dried in vacuum at 100° C. for 5 hours. Thereafter, these materials were put in the glove box having a dew point of −100° C. Then, the prepared metal lithium foil was pressed against and squeezed into the stainless steel mesh of the current collector in the glove box, whereby a negative electrode/current collector assembly was produced.

Subsequently, the separator was held between the positive electrode and the negative electrode, and the resulting assembly was put in a laminate pack having three heat-sealed sides. The position of the separator was adjusted so that the positive electrode and the negative electrode were properly opposed to each other without short circuit. Then, a sealant was applied on the positive electrode tab and the negative electrode tab, and the tab electrode portions were heat-sealed with an electrolyte solution inlet port kept open. Thereafter, a predetermined amount of an electrolyte solution was sucked into a micropipette, and fed into the laminate pack through the electrolyte solution inlet port. Finally, the electrolyte solution inlet port provided at an upper portion of the laminate pack was heat-sealed, whereby the laminate cell was completed.

The following characteristic property of each of the laminate cells (power storage devices) thus produced were measured in the following manner. The results are shown below in Table 1.

<Measurement of Energy Density (mWh/g)>

The energy density of each of the power storage devices was measured in a constant current and constant voltage charge/constant current discharge mode at 25° C. by means of a battery charge/discharge device (SD8 available from Hokuto Denko Corporation). The charge termination voltage was set to 3.8 V. After the voltage reached 3.8 V through a constant current charge process, a constant voltage charge process was further performed at 3.8 V for 2 minutes. Thereafter, a constant current discharge process was performed to a discharge termination voltage of 2.0 V. Provided that the polyaniline had a weight capacity density of 150 mAh/g, the overall capacity density (mAh/g) was calculated based on the amount of polyaniline contained in a unit area of the electrode of the power storage device. The energy density was determined so that the power storage device was charged to the full capacity and discharged in 20 hours (0.05 C).

TABLE 1

|  | Example 1 | Example 2 | Comparative Example 1 |
|---|---|---|---|
| Energy density (mWh/g) | 506 | 532 | 455 |

The results shown in Table 1 indicate that the power storage devices of Examples 1 and 2, which each employed the positive electrode containing the electrically conductive polymer particles each having a surface coated with the conductive agent, each had a higher energy density than the power storage device of Comparative Example 1, which employed the positive electrode containing the electrically conductive polymer particles each having a surface not coated with the conductive agent.

While specific forms of the embodiment of the present invention have been shown in the aforementioned inventive examples, the inventive examples are merely illustrative of the invention but not limitative of the invention. It is contemplated that various modifications apparent to those skilled in the art could be made within the scope of the invention.

The inventive power storage device can be advantageously used as a lithium secondary battery and other power storage devices. The inventive power storage device can be used for the same applications as the prior art secondary batteries, for example, for mobile electronic apparatuses such as mobile PCs, mobile phones and personal digital assistants (PDAs), and for driving power sources for hybrid electric cars, electric cars and fuel battery cars.

REFERENCE SIGNS LIST

1 CURRENT COLLECTOR (FOR POSITIVE ELECTRODE)
2 POSITIVE ELECTRODE
3 ELECTROLYTE LAYER
4 NEGATIVE ELECTRODE
5 CURRENT COLLECTOR (FOR NEGATIVE ELECTRODE)

The invention claimed is:

1. A particulate active material for a power storage device positive electrode, the particulate active material consisting of:
   particles of an electrically conductive polymer; and
   a conductive agent;
   wherein the electrically conductive polymer is a polymer containing inorganic acid anion as a dopant; and
   wherein the particles of the electrically conductive polymer each have a surface coated with the conductive agent;
   wherein the conductive agent is present in a proportion of 1 to 30 parts by weight based on 100 parts by weight of the electrically conductive polymer.

2. The particulate active material according to claim 1, wherein the electrically conductive polymer is a polyaniline or a polyaniline derivative.

3. The particulate active material according to claim 1, wherein the conductive agent is present in a proportion of 13 to 30 parts by weight based on 100 parts by weight of the electrically conductive polymer.

4. A power storage device positive electrode comprising the particulate active material according to claim 1.

5. The power storage device positive electrode according to claim 4, wherein the conductive agent is present in a proportion of 1 to 30 parts by weight based on 100 parts by weight of the electrically conductive polymer in the active material.

6. The power storage device positive electrode according to claim 4, wherein the electrically conductive polymer is a polyaniline or a polyaniline derivative.

7. The power storage device positive electrode according to claim 4, wherein the conductive agent is present in a proportion of 13 to 30 parts by weight based on 100 parts by weight of the electrically conductive polymer.

8. A power storage device comprising:
   an electrolyte layer; and
   a positive electrode and a negative electrode provided in opposed relation with the electrolyte layer interposed therebetween;
   wherein the positive electrode comprises the particulate active material according to claim 1.

9. The power storage device according to claim 8, wherein the conductive agent is present in a proportion of 1 to 30 parts by weight based on 100 parts by weight of the electrically conductive polymer in the active material.

10. The power storage device according to claim 8, wherein the electrically conductive polymer is a polyaniline or a polyaniline derivative.

11. The power storage device according to claim 8, wherein the conductive agent is present in a proportion of 13 to 30 parts by weight based on 100 parts by weight of the electrically conductive polymer.

12. A method for producing a particulate active material for a power storage device positive electrode, the particulate active material consisting of:
   particles of an electrically conductive polymer; and
   a conductive agent;
   wherein the electrically conductive polymer a polymer containing inorganic acid anion as a dopant; and
   wherein the particles of the electrically conductive polymer each have a surface coated with the conductive agent,
   the method comprising the step of shearing the electrically conductive polymer particles and the conductive agent by means of a composite particle producing apparatus to coat surfaces of the electrically conductive polymer particles with the conductive agent;
   wherein the conductive agent is present in a proportion of 1 to 30 parts by weight based on 100 parts by weight of the electrically conductive polymer.

13. The method according to claim 12, wherein the electrically conductive polymer is a polyaniline or a polyaniline derivative.

14. The method according to claim 12, wherein the conductive agent is present in a proportion of 13 to 30 parts by weight based on 100 parts by weight of the electrically conductive polymer.

* * * * *